F. A. RYTHER.
HAY PRESS.
APPLICATION FILED FEB. 1, 1909.

925,514.

Patented June 22, 1909.

Witnesses:
F. W. Hoffmeister
M. Merriman

Inventor
Frank A. Ryther
By E. W. Burgess
Attorney

UNITED STATES PATENT OFFICE.

FRANK A. RYTHER, OF CHICAGO, ILLINOIS, ASSIGNOR TO INTERNATIONAL HARVESTER COMPANY, A CORPORATION OF NEW JERSEY.

HAY-PRESS.

No. 925,514.     Specification of Letters Patent.     Patented June 22, 1909.

Application filed February 1, 1909. Serial No. 475,370.

*To all whom it may concern:*

Be it known that I, FRANK A. RYTHER, a citizen of the United States, residing at Chicago, in the county of Cook and State of Illinois, have invented certain new and useful Improvements in Hay-Presses, of which the following is a specification.

My invention relates to presses of the rebounding plunger type, and its object is to provide an improved form of brake mechanism operative to control the movement of the power transmitting means in a manner to prevent injury to the operative parts thereof when the plunger is returned to its operative position. I attain this object by means of the mechanism illustrated by the accompanying drawing, in which—

Figure 1:
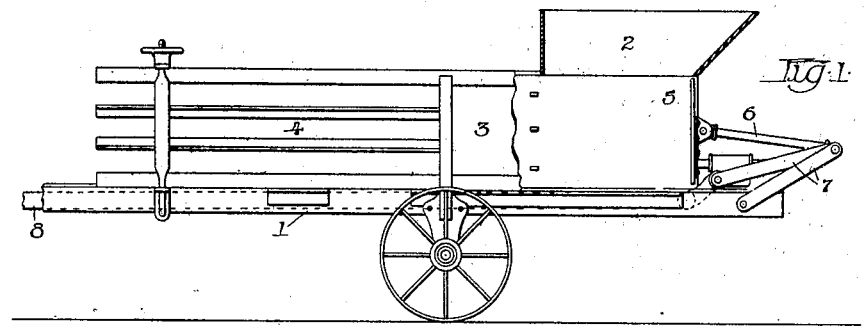
Figure 2:
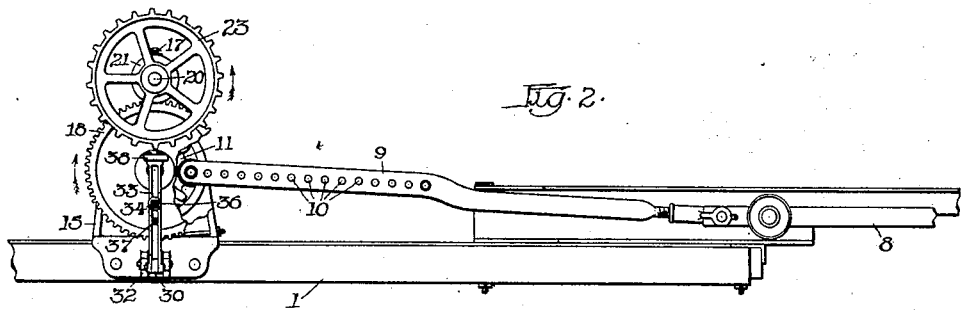

Figure 1 is a side elevation of a bale chamber and part of the plunger operating mechanism; Fig. 2 is a side elevation of part of a press, showing the plunger operating rack and its actuating gear mechanism; Fig. 3 is an end elevation of Fig. 2, partly in section, designed to illustrate the manner of connecting the brake mechanism with the power transmitting means; Fig. 4 is a detached detail drawing representing a side of the gear frame in which the transmission gears are mounted, and a side elevation of the brake mechanism as shown in Fig. 3; and Fig. 5 is a detail drawing of the brake shoe forming part of the brake mechanism.

Like reference characters designate the same parts throughout the several views.

Referring to the drawings, 1 is the bed frame of the machine, 2 the feed hopper, 3 the press chamber, 4 the bale chamber, 5 the presser head, 6 the plunger having one end connected with the head, and 7 represents toggle members having their lower ends pivotally connected with opposite sides of the bed frame and their upper ends with the opposite end of the plunger 6.

8 is a pull bar having one end connected with the upper end of the toggle members 7 and its opposite end with one end of a rack bar 9, the opposite end of the rack bar being provided with transversely arranged pins 10 upon opposite sides thereof that are adapted to engage with pinions 11 and 12 secured to the inner ends of axially alined shafts 13 and 14, respectively, journaled in bearings forming parts of vertically arranged gear frame members 15 and 16, having their lower ends secured to the bed frame and their upper ends connected by means of a stay rod 17, the pinions being spaced apart in a manner to receive the rack bar between them, and 18 and 19 represent gear wheels mounted upon the shafts 13 and 14, respectively, and adapted to move longitudinally thereon. The gear wheels derive motion from the shaft 20 journaled at the upper end of the gear frame, and having secured to opposite ends thereof pinions 21 and 22 that mesh with the gear wheels 18 and 19, respectively, and a sprocket wheel 23 that may be connected with any source of power. The shafts 13 and 14 are provided with peripheral spiral grooves 24, and 25 represent set screws received by the portions of the gear wheels 18 and 19, and having their inner ends received by the grooved portion of the shafts in a manner to cause said gears to move longitudinally upon said shafts within certain limits.

Secured to the shafts, adjacent the inner ends of the gear wheels, are clutch members 26 that are adapted to engage with the inner ends of the hubs of the gear wheels when the latter are caused to move inward, in a manner to transmit motion to said shafts. One of the clutch members is provided with a friction brake wheel 27, and 28 represents a brake shoe pivotally connected with an inwardly projecting arm 29 of a vertically arranged lever 30 by means of a link 31, the lever being pivotally connected with a bracket 32 secured to the bed frame member of the machine, and 33 designates a vertically arranged arm, having its lower end pivotally connected with the lower end of lever 30, and connected intermediate its ends with the upper end of said lever by means of a bolt 34 that passes through the two members, and 35 represents a coiled spring surrounding said bolt and operative between an adjusting nut 36 and the arm in a manner to yieldingly draw the two parts toward each other, and 37 is a set screw received by the arm and operative to limit the movement of the arm toward the lever; the upper end of the arm being provided with a roller 38 journaled upon a vertical axis and adapted to contact with the outer end of the hub of gear wheel 18, when the latter is moved outward upon the shaft, and in a manner to move the arm and its associated lever in a direction to cause the arm 29, through the connecting link 31, to move the brake shoe in contact with the brake wheel 27 with more or less force, dependent upon the tension of spring 35.

In operation, motion is transmitted to the sprocket wheel 23, which gives motion to shaft 20 in the direction of the arrow, as shown in Fig. 2, and the pinions secured thereto cause the gear wheels to rotate in opposite directions, and said wheels being engaged with the clutch members secured to the shafts 13 and 14, cause the pinions 11 and 12 secured thereto to rotate and transmit motion to the rack and pull bar in a direction to cause the presser head to move within the press chamber against a charge of material admitted thereto. When the head has reached the limit of its operative movement and is about to move backward, the elasticity of the compressed material causes it to quickly rebound, and to prevent a too rapid movement thereof, which would cause danger of breakage of parts of the mechanism, is the function of my improved mechanism. When the presser head rebounds the rack bar rotates the pinions 11 and 12 and shafts 13 and 14 in advance of the gear wheels 18 and 19, and cause the latter to move outward by reason of the set screws engaging with the spirally arranged grooves upon the shafts, and the outward movement of the gear wheel 18 causes its hub portion to engage the roller upon the arm 33 in a manner to advance the brake shoe against the rotating friction brake member and thereby retard the rotative movement of the pinions and the backward movement of the presser head.

What I claim as my invention, and desire to secure by Letters Patent, is:

1. A hay press including, in combination, a press chamber, a presser head, means for actuating said head, said means including a power transmitting shaft, a clutch member secured to said shaft, a power transmitting gear movable longitudinally upon said shaft and provided with a complemental clutch member adapted to engage with said first mentioned clutch member when said gear is moved in one direction, and brake mechanism operative to retard the movement of said power transmitting means in one direction and controlled by the longitudinal movement of said gear in an opposite direction.

2. A hay press including, in combination, a press chamber, a presser head, means for actuating said head, said means including a power transmitting shaft, a clutch member secured to said shaft, a power transmitting gear movable longitudinally upon said shaft and provided with a complemental clutch member adapted to engage with said first mentioned clutch member when said gear is moved in one direction, brake mechanism operative to retard the movement of said power transmitting means in one direction, a friction wheel secured to said shaft, a brake shoe adapted to engage with said friction wheel, the movement of said shoe being controlled by the longitudinal movement of said gear.

3. A hay press including, in combination, a press chamber, a presser head, means for actuating said head, said means including a power transmitting shaft, a clutch member secured to said shaft, a friction wheel forming part of said clutch member, a power transmitting gear wheel movable longitudinally upon said shaft and provided with a complemental clutch member adapted to engage with said fixed clutch member when said gear is moved in one direction, a brake shoe adapted to engage with said friction wheel, said brake shoe being pivotally connected with a lever that is pivotally connected with a fixed part of the machine and adapted to contact with said gear wheel when the latter is moved in one direction.

4. A hay press including, in combination, a press chamber, a presser head, means for actuating said head, said means including a power transmitting shaft, a clutch member secured to said shaft, a friction wheel forming part of said clutch member, a power transmitting gear wheel movable longitudinally upon said shaft and provided with a complemental clutch member adapted to engage with said fixed clutch member when said gear wheel is moved in one direction, a brake shoe adapted to engage with said friction wheel, a lever pivotally connected with a fixed part of the machine, an arm having one end pivotally connected with said lever and its opposite end adapted to contact with the hub of said gear wheel when the latter is moved in one direction, said arm being adjustable about its pivotal connection with said lever, and a connection between said lever and said brake shoe.

5. A hay press including, in combination, a press chamber, a presser head, means for actuating said head, said means including a power transmitting shaft, a clutch member secured to said shaft, a friction wheel forming part of said clutch member, a power transmitting gear wheel movable longitudinally upon said shaft and provided with a complemental clutch member adapted to engage with said fixed clutch member when said gear wheel is moved in one direction, a brake shoe adapted to engage with said friction wheel, a lever pivotally connected with a fixed part of the machine, a link connection between said lever at one side of its pivotal connection to said brake shoe, an arm having one end pivotally connected with said lever at the opposite side of its pivotal connection, the opposite end of said arm being adapted to contact with the hub of said gear wheel when the latter is moved in one direction, a spring operative to yieldingly move the arm and lever toward each other, and means for limiting such movement.

FRANK A. RYTHER.

Witnesses:
 A. B. DACK,
 I. U. B. HOSSACK.